Oct. 10, 1933.  E. REICH  1,929,714
ELECTRICAL MEASURING INSTRUMENT
Filed Sept. 10, 1931  2 Sheets-Sheet 1
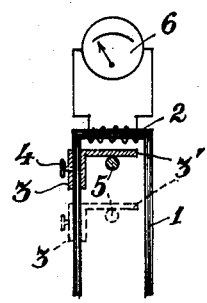
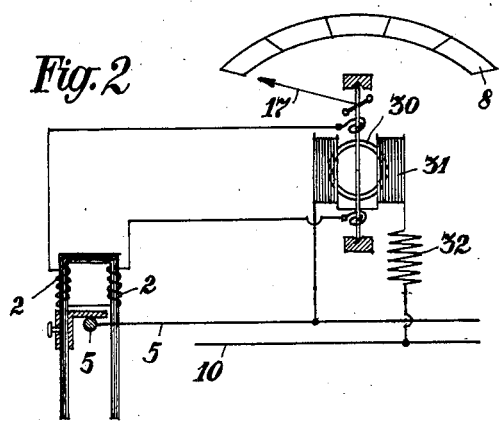
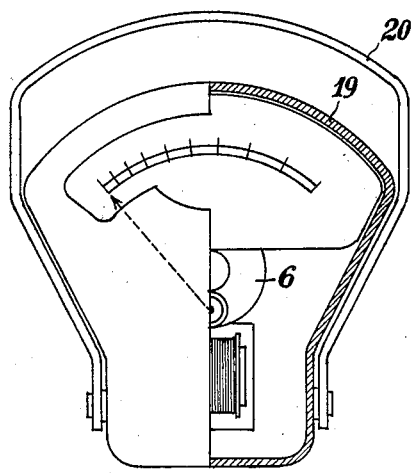
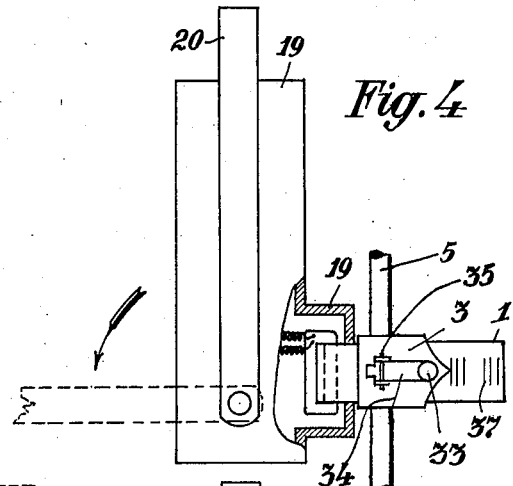
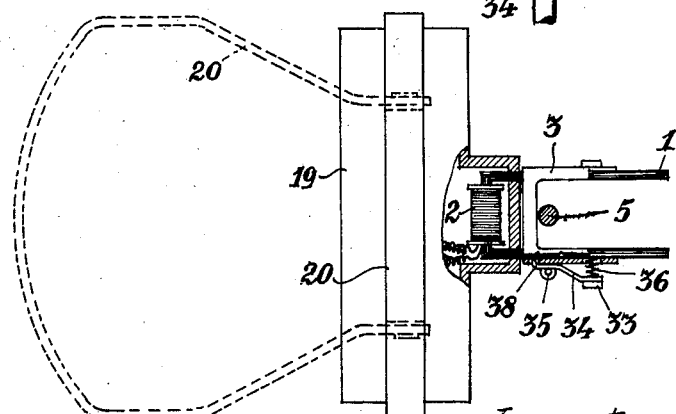
Inventor:
E. Reich
by E. F. Wendroth
Atty Oct. 10, 1933.  E. REICH  1,929,714
ELECTRICAL MEASURING INSTRUMENT
Filed Sept. 10, 1931   2 Sheets-Sheet 2
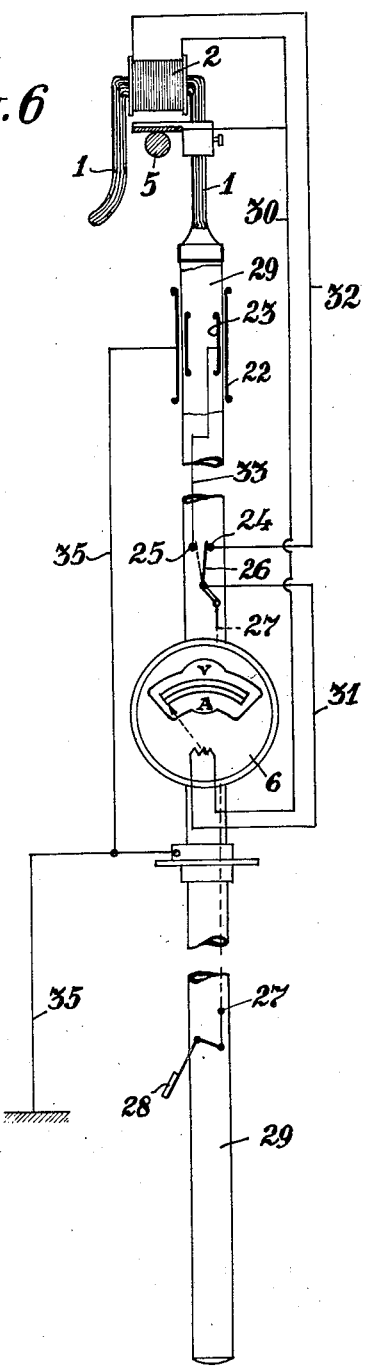
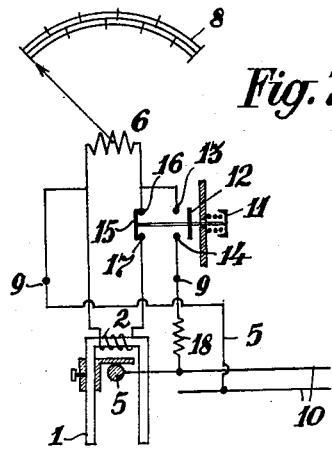
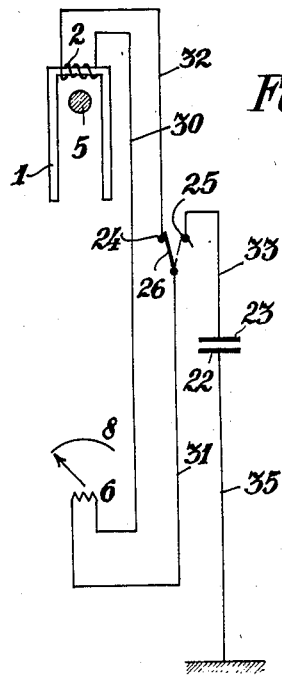
Inventor:
E. Reich,
by E. F. Wenderoth
Atty Patented Oct. 10, 1933

1,929,714

UNITED STATES PATENT OFFICE 1,929,714

ELECTRICAL MEASURING INSTRUMENT

Ernest Reich, Budapest, Hungary

Application September 10, 1931, Serial No. 562,143, and in Germany September 20, 1930

11 Claims. (Cl. 171—95)

The invention relates to improvements in electrical measuring instruments, more particularly to ammeters, by means of which the current flowing in a conductor can be measured with quantitative accuracy without having to break the conductor circuit and without necessitating any physical attachment of the ends of the conductor to the instrument.

According to the present invention the device comprises a preferably fork-shaped iron core, on which the induction-coil is mounted, a fixed or a movable spacing, preferably a stop being provided on the said core by means of which it is possible to limit or fix the distance between the conductor and the coil, so as to ensure that the amount of induced current in the coil shall always remain the same, and that, accordingly the indicating instrument shall always show the accurate quantitative amount of current flowing in the conductor.

The experiments made in connection with this instrument have shown that if once the scale, of the indicating instrument has been adjusted to a certain distance from a wire of e. g. 6 mm. diameter, then it is possible to fix, by means of a sliding stop another distance at which the same indication is obtained by a load twice as high so that the accurate load is obtained by multiplying the readings by two.

The invention relates further to various useful combinations suitable for measuring all the data required in order to provide full information to the staff of an electric power plant about conditions prevailing at any moment. In other words the combined instrument enables amperes, volts, insulation, voltamperes and watts to be measured in low-tension as well as in high-tension plants. Further it is possible to use any already existing part of the instrument e. g. the coil-casing turned towards the fork-legs.

Certain preferred embodiments of the invention are shown, by way of example, on the accompanying drawings.

The drawings illustrate certain embodiments of the invention, shown by way of example. Notably, Fig. 1 is a wiring diagram of the ammeter, Fig. 2 illustrates a wattmeter.

Fig. 3 illustrates in front view and cross section the assembly of an ammeter with a measuring instrument of the usual type.

Fig. 4 is the corresponding side view, partly in longitudinal section.

Fig. 5 is a view from above and plan of the same instrument, partly in section.

Fig. 6 illustrates a current and voltage or earth fault measuring instrument for high tension for overhead lines.

Fig. 7 illustrates an instrument for the measurement of voltage or current, capable of being put in circuit by means of a push-button switch.

Fig. 8 is a diagram of connections explaining Fig. 6.

On the iron-core 1 (Fig. 1) which is preferably fork-shaped and laminated, the coil 2 connected with the indicating device 6 is arranged. On one leg of the iron core a sleeve 3 capable of being displaced by sliding and of being fixed in the desired position and carrying a stop 3' is provided; the fixing of the latter in the desired position is effected by means of a screw 4. The currents induced in coil 2 by the conductor 5 (concerning which it is desired to effect measurements) operate the indicating device 6, the pointer of which will be deflected in a measure corresponding to the current to be measured.

It is also possible to employ this measuring instrument as an auxiliary device connected with a wattmeter. In this case the coils 2 are connected with the rotatably supported current coil 30 of the wattmeter. (Fig. 2.) The fix coils 31 of the wattmeter are connected across a series resistance 32 to the mains 10, a part of which forms conductor 5. The pointer 17 of the wattmeter, moving along scale 8, indicates the amount of power transmitted from the mains 10 to conductor 5.

Figs. 3, 4 and 5 illustrate the assembly of an ammeter according to the invention with a measuring instrument of the usual type, this assembly being effected inside a casing 19 fitted with a reversible handle 20 which latter is capable of snapping into a vertical position parallel to the casing and becoming locked in that position.

Figs. 4 and 5 illustrate a stop 3 fitted with a particularly advantageous type of fixing member. Stop 3 is capable of being displaced by sliding and fitted with a lever 34, which latter is pressed with its end 38 against the leg of the iron core 1 around pivot 35, by the action of spring 36. By operating the push-button 33 against the action of spring 36, stop 3 is set free and can be moved in any desired position and fixed there respectively. In addition hereto the fork leg 1 is fitted with numbered marks 37 showing those different positions, into which stop 3 may be adjusted in order to enable correct readings to be always obtained in the indicating device at varying diameters of the conductors 5. The figures along marks 37 at the same time indicate the diameters of the conductors. On the other leg these markings may indicate those positions of the stop in which correct values may be obtained by multiplication with suitable numbers corresponding to results obtained by experiments.

Figs. 3, 4 and 5 show that the coil 2 as well as the indicating device are situated inside the casing, whilst the leg ends of the iron core 1 as well as the stop 3 touching the conductor 5 protrude from the casing 19.

An instrument suitable for high-tension measurements is shown on Fig. 6. One leg end of the iron core 1 is connected with a tubular handle 29 made of insulating material. The instrument is equally suitable for the measurement of voltage, of earth resistance and of current, the necessary switching over being effected by a reversing switch 26. If the latter is in its position on contact 24 as shown in Figs. 6 and 8, the coil 2 is connected through wire 30, 31, 32 with the indicating device 6 which measures the current flowing in the conductor 5.

For the purposes of voltage measurement, the tube carries a condenser which preferably consists of an outside sleeve 22 and an inside sleeve 23. Instead of a condenser a high resistance multiplier may be used. One of the poles of the condenser, the sleeve 23 is connected with the switch contact 25 through wire 33, whilst the other pole—the sleeve 22—is earthed through wire 35. If now the switch 26 is switched over to contact 25 and the apparatus suspended on, or connected with a high-tension line, the milli-ammeter (coil 6 of the measuring mechanism) will measure the charging current of the condenser 22, 23 which charging current is proportional to the voltage relative to ground of the conductor 5.

A considerable advantage of this arrangement consists in the fact that with the instrument according to Fig. 6 earth faults can easily be detected or, if an ohm scale is provided on the indicating instrument 6, resistance relative to the ground can also be measured. In order to enable the current and voltage values mutually corresponding at each moment to be ascertained, a rod 27 made of insulating material is connected with the reversing switch lever 26 so that reversing can be effected under voltage by means of the bell-crank lever 28 and thus it is possible to measure current and voltage in rapid succession, and obtain the figure for the volt-amperes at each moment.

Fig. 7 illustrates a measuring instrument suitable for the measurement of voltage and current. Reversal is effected by means of the push-button 11, connecting the indicating instrument 6 in its position of rest, across contacts 15, 16 and 17 with coil 2, whilst in its pushed-in position it connects the indicating instrument 6 across contacts 12, 13 and 14 with the voltage terminals 9 of the instrument. The voltage terminals 9 are connected to the mains 10 through a series resistance 18.

What I claim is:

1. An electrical indicating device for measuring the current flow through a conductor, comprising an iron core having legs, an induction coil on said core between said legs, and an adjustable stop disposed between said legs and movable into a plurality of positions, and against which said conductor abuts.

2. An electrical indicating device for measuring the current flow through a conductor, comprising a fork-shaped iron core, at least one induction coil disposed on said core between said legs, a slidable stop disposed on one leg of said core, and a spring-pressed lever for securing said stop in adjusted position, and for releasing said stop for further adjustment, said stop fixing the spacing between said conductor and said coil.

3. An electrical indicating device for measuring the current flow through a conductor, comprising a fork-shaped iron core, at least one induction coil disposed on said core between said legs, a slidable stop disposed on one leg of said core, a spring-pressed lever for securing said stop in adjusted position, and for releasing said stop for further adjustment, and markings on one of said legs for indicating the position of the slide and corresponding to the diameter of the conductor to be measured, said stop fixing the spacing between said conductor and said coil.

4. An electrical indicating device for measuring the current flow through a conductor, comprising a fork-shaped iron core, at least one induction coil disposed on said core between said legs, a slidable stop disposed on one leg of said core, a spring-pressed lever for securing said stop in adjusted position, and for releasing said stop for further adjustment, and markings on one of said legs, indicating the position of the slide, and each corresponding to a predetermined multiplier, which, when the readings of the instrument are multiplied therewith, give the correct reading, said stop fixing the spacing between said conductor and said coil.

5. An electrical indicating device for measuring the current flow through a conductor, comprising an indicating instrument, a housing therefor, a fork-shaped iron core, an induction coil on said core between said legs, the terminals of said coil being connected to said instrument, said coil being disposed within said housing, and the legs of the fork protruding from said housing, and a stop disposed adjustably on one of said legs exteriorly of the housing, and against which the conductor abuts, to control the spacing and hence the induction between the conductor and the coil.

6. An electrical indicating device for measuring the characterictics of energy passing through a circuit comprised of conductors, comprising at least one indicating instrument, an iron core having legs, a coil on said core between said legs, the ends of said coil being connected to said instrument, a parallel connection between said circuit and said instrument, and a push button for connecting either said coil or said parallel connection to said instrument, and for simultaneously breaking the other of said connections.

7. An electrical indicating apparatus, comprising a fork-shaped iron core having legs, an induction coil on said core, an insulating tubular handle on one of said legs, a measuring instrument disposed on said handle, to which the induction coil is connected, and a conductor, the energy of which is to be measured, disposed between said legs at a predetermined distance from said core.

8. An electrical indicating apparatus, comprising a fork-shaped iron core having legs, an induction coil on said core, an insulating tubular handle on one of said legs, a measuring instrument disposed on said handle, to which the induction coil is connected, a current intensifying device on said handle, and connected with said instrument, a ground connected with said intensifying device and with said instrument, and a conductor, the energy of which is to be measured, disposed between said legs at a predetermined distance from said core, and a reversing switch on said handle, for switching said instrument alternately from a connection across said coil, to a grounded connection through the intensifier to the conductor.

9. An electrical indicating apparatus, comprising a fork-shaped iron core having legs, an induction coil on said core, an insulating tubular handle on one of said legs, a measuring instrument disposed on said handle, to which the induction coil is connected, a current intensifying device on said handle, and connected with said instrument, a ground connected with said intensifying device and with said instrument, and a conductor, the energy of which is to be measured, disposed between said legs at a predetermined distance from said core, a reversing switch on said handle, for switching said instrument alternately from a connection across said coil, to a grounded connection through the intensifier to the conductor, and a lever connected to said switch for rapidly changing over from current to voltage measurements, and vice versa, to obtain practically simultaneous volt-ampere readings.

10. An electrical indicating device, and a handle therefor, shaped somewhat to the contours of the device, secured to said device adjacent the ends of the longer sides thereof, and being swingable from a carrying position substantially in the plane of the device, where it surrounds the short end of the device farthest from the points of attachment of the handle to a carrying position substantially at right angles to the said plane.

11. An electrical indicating device, and a handle therefor, shaped somewhat to the contours of the device, secured to said device adjacent the ends of the longer sides thereof, and being swingable from a carrying position substantially in the plane of the device, where it surrounds the short end of the device farthest from the points of attachment of the handle to a carrying position substantially at right angles to the said plane, and means for snapping said handle into, and locking it in its said positions.

ERNEST REICH.